United States Patent [19]
Fauteux et al.

[11] Patent Number: 5,601,623
[45] Date of Patent: Feb. 11, 1997

[54] ELECTROLYTIC CELL AND ELECTROLYTIC PROCESS WITHIN A CARBON DIOXIDE ENVIRONMENT

[76] Inventors: Denis G. Fauteux, 359 Arlington St., Acton, Mass. 01720; Arthur A. Massucco, 20 Tamarack Rd., Natick, Mass. 01760

[21] Appl. No.: 510,750

[22] Filed: Aug. 3, 1995

[51] Int. Cl.$^6$ .................................................. H01M 6/00
[52] U.S. Cl. .................. 29/623.1; 429/212; 429/218; 204/242; 204/278
[58] Field of Search .................. 29/623.1; 429/212, 429/218; 204/242, 278

[56] References Cited

U.S. PATENT DOCUMENTS

| | | | |
|---|---|---|---|
| 4,778,737 | 10/1988 | Sehm | 429/206 |
| 5,212,867 | 5/1993 | Vogel | 29/623.1 |
| 5,346,787 | 9/1994 | Chaloner-Gill | 29/623.1 |

*Primary Examiner*—Bruce F. Bell
*Attorney, Agent, or Firm*—Dick and Harris

[57] ABSTRACT

An electrolytic cell, such as a rechargeable lithium battery, fabricated in a carbon dioxide atmosphere, having a lithium carbonate passivating layer associated with a lithium ion source electrode and an electrolyte. Fabrication of an electrolytic cell containing an acrylic polymer paste cathode, anode and electrolyte increases the efficiency of the polymer initiator and facilitates free radical chain growth polymerizations.

8 Claims, 1 Drawing Sheet

ELECTROLYTIC CELL AND ELECTROLYTIC PROCESS WITHIN A CARBON DIOXIDE ENVIRONMENT

BACKGROUND OF THE INVENTION

1. Field of the Invention

The present invention relates in general to secondary cells and, more particularly, to an electrolytic cell and electrolytic process associated therewith, wherein a chain growth polymerization reaction is substantially increased through the use of carbon dioxide gas.

2. The Prior Art

Rechargeable, or secondary cells, have been known in the art for many years. Furthermore, secondary cells constructed with an acrylic polymer cathode paste or an acrylic polymer electrolyte have likewise been known in the art.

While such cells have been functional, problems have resulted inasmuch as the acrylic based components typically contain impurities such as oxygen and excess polymerization initiator. Oxygen within the electrolytic cell hinders free radical chain growth polymerization reactions. The use of increased levels of polymerization initiator is necessary, therefore, in order to overcome the effect of the oxygen. Increasing the amount of initiator, however, decreases the purity of the acrylic polymer because the excess initiator is incorporated into the polymer.

Although the prior art does disclose the use of argon and nitrogen gas as a means for displacing oxygen, these gases are relatively expensive, and not very soluble in acrylic monomers. Additionally, such prior art acrylic based cells typically maintain at least trace amounts of water therein. This trace amount of water would react with the electrolyte to form an acid, such as hydrofluoric acid, which would react destructively with the lithium source anode and/or lithium intercalation cathode.

Although the use of carbon dioxide is known by polymer chemists as a means to facilitate chain growth polymerization reactions in supercritical fluids, (see for example, Shaffer, K. A. and DeSimone, J. M., Chain Polymerization in Inert Near— and Supercritical Fluids, TRIP, Vol. 3, No. 5 pg. 146), the use of carbon dioxide in an acrylic polymer based electrolytic cell and electrolytic process, has not been taught or suggested by the prior art. It is thus an object of the present invention to provide an electrolytic cell and associated process wherein the electrolytic cell is assembled in an atmosphere substantially comprised of carbon dioxide.

It is also an object of the present invention to provide an electrolytic cell and associated process wherein the electrolytic cell assembled in the substantially carbon dioxide atmosphere retains a predetermined amount of carbon dioxide in the electrolytic cell after assembly.

It is further an object of the present invention to provide an electrolytic cell and associated process wherein the carbon dioxide substantially displaces oxygen in an acrylic cathode paste or acrylic electrolyte to, in turn, increase the efficiency of the initiator in a chain growth polymerization reaction.

These and other objects of the present invention will become apparent in light of the attached Specification, Claims, and Drawings.

SUMMARY OF THE INVENTION

The present invention comprises an electrolytic process associated with the fabrication of an electrolytic cell. The fabrication of the electrolytic cell comprises the steps of: (1) inserting sub components of an electrolytic cell into a chamber having an atmosphere, wherein at least one of the sub components includes a lithium source substrate, an electrolyte, and a cathode paste, and, wherein at least one of the electrolyte or cathode paste is acrylic based; (2) displacing the atmosphere within the chamber with carbon dioxide; (3) forming a passive layer which includes lithium carbonate on the lithium source substrate; (5) displacing oxygen, which may be in the acrylic based cathode paste or electrolyte, with carbon dioxide to, in turn, facilitate a free-radical chain growth reaction; (6) fabricating the sub components into components for use in the electrolytic cell, and (7) assembling the fabricated components into an electrolytic cell.

In a preferred embodiment of the invention, the passive layer will restrict the penetration of acids, generated within the completely fabricated electrolytic cell during aging and operation, through the passive layer and into contact with the lithium source substrate.

Also in a preferred embodiment of the invention, the step of displacing the atmosphere within the chamber with carbon dioxide further comprises the step of saturating at least one of the acrylic based cathode paste or the electrolyte with carbon dioxide. It is also contemplated that the electrolytic process further comprise the step of maintaining a predetermined amount of carbon dioxide within the fully fabricated electrolytic cell to, in turn, prevent reabsorption of oxygen within at least one of the electrolyte or the cathode paste.

In this preferred embodiment of the invention, the step of fabricating the components may further include the steps of: (1) applying a cathode paste onto a substrate; (2) curing the cathode paste; (3) applying the electrolyte over the cathode paste; and (4) curing the electrolyte. Furthermore, the step of assembling the fabricated sub components may comprise the step of associating an anode with the electrolyte and cathode, to, in turn, result in a fully assembled electrolytic cell.

BEST MODE FOR PRACTICING THE INVENTION

Figure 2:
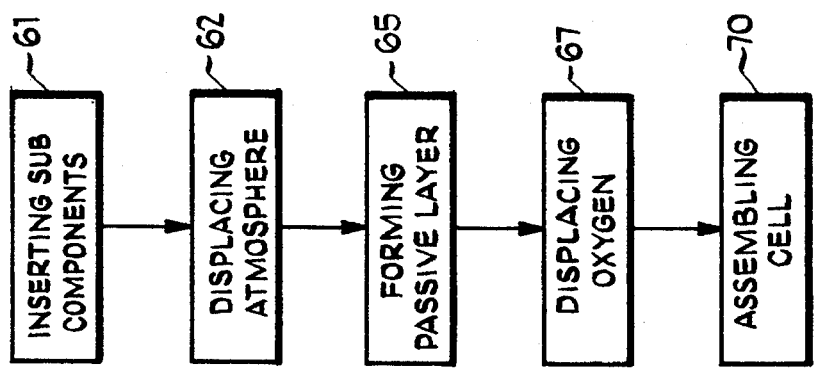
FIG. 2. of the drawings is a flow chart of the present electrolytic process.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Figure 1:
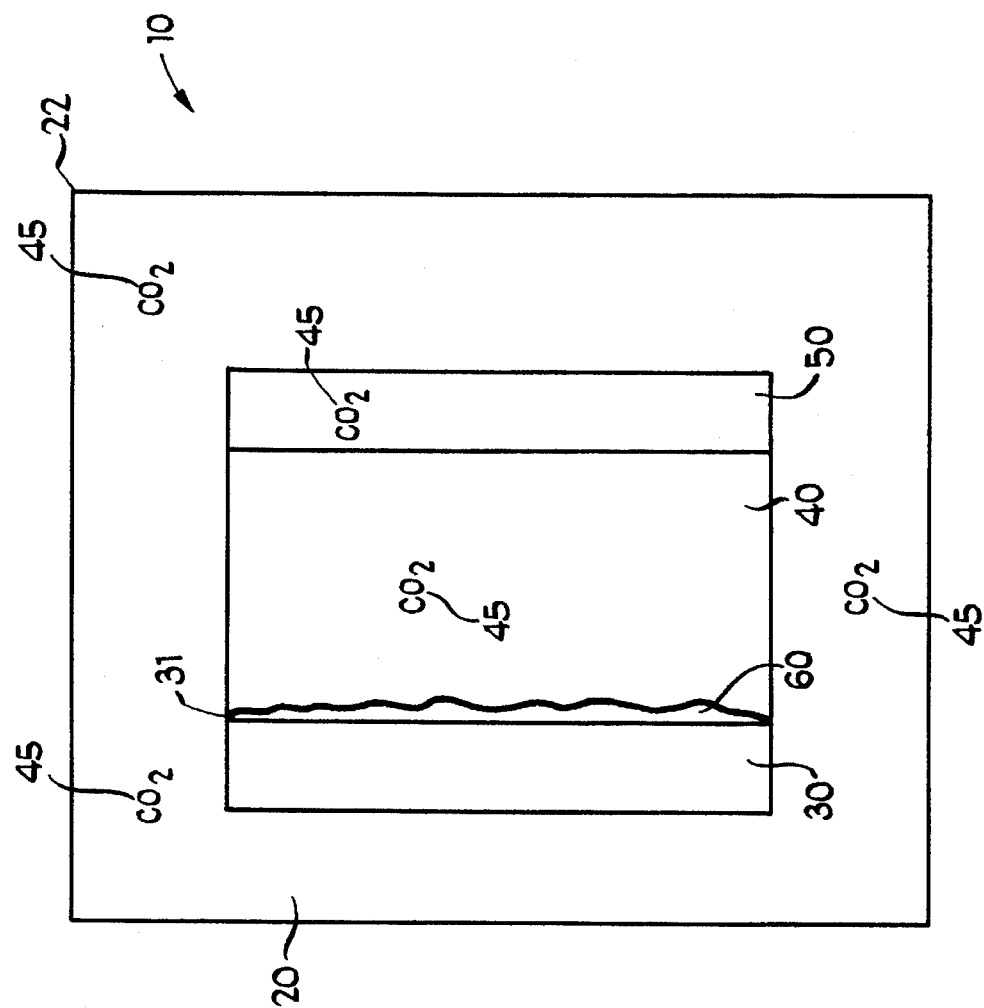
FIG. 1. of the drawings is a schematic representation of the present electrolytic cell.

Electrolytic cell 10 is shown in FIG. 1 as including native atmosphere 20, chamber 22, metal ion source electrode 30, surface 31, electrolyte 40, cathode 50, and passivating layer 60. For purposes of explanation of the present invention, metal ion source electrode 30 will be described as a lithium source anode for use in a rechargeable electrolytic cell/ battery. However, it will be understood to those with ordinary skill in the art, that the principles associated with the claimed and described invention would also be applicable for use with a cathode, such as cathode 50, as well as with respect to other types of alkali metal ion source electrodes. Furthermore, it should also be noted that the term atmosphere, as used herein, comprises any existing atmospheric conditions (including no atmosphere, i.e. a vacuum) present in the chamber prior to displacement thereof with carbon dioxide, as will be explained.

Cathode 50 and electrolyte 40 are both constructed with an acrylic polymer. However, it is also contemplated that only one of such components be acrylic based. Acrylic polymer cathode paste 50 and acrylic polymer electrolyte 40 further include means for precluding the absorption of oxygen 45. The oxygen precluding means substantially comprises carbon dioxide positioned within the fully assembled electrolytic cell. For example, and as will be explained in greater detail, the carbon dioxide may be maintained in acrylic polymer cathode paste 50 and/or in acrylic polymer electrolyte 40. Indeed, actual positioning and maintaining of the carbon dioxide therein is accomplished by fabricating the acrylic polymer cathode paste and acrylic polymer electrolyte in a carbon dioxide environment, within chamber 22, in order to displace oxygen existing in, for example, the acrylic monomers.

Inasmuch as carbon dioxide is more soluble in acrylic polymer systems than oxygen, it is able to displace the oxygen which would hinder free radical chain growth polymer reactions. The carbon dioxide also increases the efficiency of the initiator used in the chain growth reactions and thereby allows the use of a lower amount of initiator, than previously known in the art, which, in turn, minimizes the ability of waste initiator being incorporated into the polymer as an impurity.

While the prior art teaches the use of nitrogen and argon gas as a purging agent of oxygen in the formation of an electrolytic cell, it is silent as to the use of carbon dioxide. The use of carbon dioxide, however, has significant advantages over the use of nitrogen or argon especially when used for the fabrication of acrylic based components. For example, (1) carbon dioxide is in substantial chemical equilibrium with the electrolyte and the initiator; (2) the carbon dioxide displaces oxygen in the acrylic polymer cathode paste or electrolyte which may hinder free radical chain growth reactions necessitating relatively large amounts of initiator; (3) carbon dioxide reacts with lithium to form a favorable passivating layer while nitrogen and argon do not, or, in the case of nitrogen, an unfavorable passivating layer may be formed; and (4) carbon dioxide is a relatively inexpensive and safe inactive gas.

After the sub components of the electrolytic cell, including the acrylic cathode paste and electrolyte, have been fabricated, the components, like the sub components, are then assembled into an electrolytic cell under a carbon dioxide environment. Therefore, once cell assembly is complete, the internal components of the cell retain a predetermined amount of carbon dioxide. The predetermined amount of carbon dioxide integrated into the cell is desirable, indeed, even preferred, because it will prevent the reabsorption of oxygen into the acrylic based electrolytic cell. Also, it is typical that trace amounts of water will remain in a fabricated cell. This water may react with the electrolyte to form an acid, such as hydrofluoric acid, which is destructive to the lithium anode (and, of course, could also be destructive to the cathode). Maintaining carbon dioxide within the fabricated electrolytic cell renders the generated acids substantially inactive, thus increasing the life of the lithium anode.

In operation, and as shown in the flow chart of FIG. 2, the fabrication of an electrolytic cell and associated electrolytic process takes place in a sealed chamber 22 (FIG. 1) having an atmosphere (typically an ambient atmosphere) 20 (FIG. 1). First, the sub components, including an acrylic polymer paste cathode or an acrylic polymer electrolyte, are inserted 61 within the sealed chamber. After the sub components are placed within the sealed chamber, the existing atmosphere 20 (FIG. 1) is displaced 62 with carbon dioxide, thereby saturating both the sealed chamber and the acrylic based sub components with carbon dioxide. Although the present invention has been described with respect to saturating the acrylic based sub components with carbon dioxide, merely displacing oxygen within the acrylic monomer, with the carbon dioxide, is also contemplated.

Once the ambient atmosphere is displaced with carbon dioxide, a passivating layer is formed 65 upon the surface 31 of lithium source substrate 30. The passivating layer comprises a thin layer of lithium carbonate formed by the reaction of the carbon dioxide and the lithium source substrate. This lithium carbonate passivating layer allows ions, associated with the electrolytic process, to pass through to the lithium source substrate, but precludes acids generated during cell operation from attacking the surface of the lithium source substrate.

Furthermore, because the carbon dioxide is more soluble in acrylic polymer systems than nitrogen or argon, the carbon dioxide more easily displaces oxygen within either the acrylic polymer cathode paste or acrylic polymer electrolyte with carbon dioxide. Displacing oxygen in the acrylic polymers with carbon dioxide increases the efficiency of the polymer initiator, allows the formation of a thinner polymer based electrolyte film (due to the enhanced quality of the polymer matrix), and facilitates the creation of a polymer, through a chain growth reaction, with substantially fewer impurities than a polymer synthesized in an atmosphere comprised of oxygen. Finally, the sub components are likewise assembled in an atmosphere substantially comprised of carbon dioxide. This step is necessary to ensure that the fabricated acrylic based electrolytic cell retains a predetermined amount of carbon dioxide so that acids, formed by the reaction of water and the electrolyte, are rendered substantially inactive.

We claim:

1. An electrolytic process associated with fabrication of an electrolytic cell comprising the steps of:

inserting sub components of an electrolytic cell into a chamber having an atmosphere, at least one of the sub components includes a lithium source anode, an electrolyte and a cathode wherein at least one of the electrolyte, anode or cathode is acrylic based, displacing the atmosphere within the chamber with carbon dioxide, displacing oxygen, which may be in the at least one of the acrylic based anode, cathode or electrolyte, with carbon dioxide to, in turn, facilitate a free-radical chain growth reaction, fabricating the sub components into components for use in the electrolytic cell, and assembling the fabricated components into an electrolytic cell.

2. The process according to claim 1, further including the step of restricting penetration of acids generated within the completely fabricated electrolytic cell, during aging and operation, through the passive layer, and, in turn, into contact with the lithium source anode.

3. The process according to claim 1, wherein the step of displacing the atmosphere within the chamber with carbon dioxide further comprises the step of:

saturating the at least one of the acrylic based anode, cathode or electrolyte with carbon dioxide.

4. The process according to claim 1 further comprising the step of maintaining a predetermined amount of carbon dioxide within the fully fabricated electrolytic cell to, in turn, prevent reabsorption of oxygen within at least one of the electrolyte, anode and cathode.

5. The process according to claim 1 wherein the sub components further include a cathode paste; the step of fabricating the components includes the steps of:

applying the cathode paste onto a substrate;

at least partially curing the cathode paste;

applying the electrolyte over the cathode paste; and at least partially curing the electrolyte.

6. The process according to claim 5 wherein the step of assembling the fabricated sub components further comprises the step of associating an anode with the electrolyte and cathode, to, in turn, result in a fully assembled electrolytic cell.

7. The process according to claim 1 wherein the sub components further include an anode paste; the step of fabricating the components includes the steps of:

applying the anode paste onto a substrate;

at least partially curing the anode paste;

applying the electrolyte over the anode paste; and at least partially curing the electrolyte.

8. The process according to claim 7 wherein the step of assembling the fabricated sub components further comprises the step of associating a cathode with the electrolyte and anode, to, in turn, result in a fully assembled electrolytic cell.

* * * * *